(12) United States Patent
Zhang et al.

(10) Patent No.: US 10,112,250 B2
(45) Date of Patent: Oct. 30, 2018

(54) WELDING SOURCE AND AC-DC ARGON ARC WELDING MACHINE

(71) Applicant: SHENZHEN JASIC TECHNOLOGY CO., LTD., Shenzhen, Guangdong (CN)

(72) Inventors: Jinlei Zhang, Guangdong (CN); Lei Pan, Guangdong (CN)

(73) Assignee: SHENZHEN JASIC TECHNOLOGY CO., LTD., Shenzhen (CN)

( * ) Notice: Subject to any disclaimer, the term of this patent is extended or adjusted under 35 U.S.C. 154(b) by 21 days.

(21) Appl. No.: 15/364,575

(22) Filed: Nov. 30, 2016

(65) Prior Publication Data

US 2017/0320157 A1 Nov. 9, 2017

(30) Foreign Application Priority Data

May 3, 2016 (CN) .......................... 2016 1 0286861

(51) Int. Cl.
| | |
|---|---|
| *B23K 9/00* | (2006.01) |
| *B23K 9/10* | (2006.01) |
| *H02M 7/06* | (2006.01) |
| *H02M 7/797* | (2006.01) |
| *H02M 7/5387* | (2007.01) |

(52) U.S. Cl.
CPC .......... *B23K 9/1006* (2013.01); *B23K 9/1043* (2013.01); *H02M 7/06* (2013.01); *H02M 7/797* (2013.01); *H02M 7/5387* (2013.01)

(58) Field of Classification Search
CPC .... B23K 9/1006; B23K 10/006; B23M 9/043; H02M 7/06; H02M 7/797; H05H 1/36

USPC .................... 219/130.1, 130.51, 121.54
See application file for complete search history.

(56) References Cited

U.S. PATENT DOCUMENTS

| | | | |
|---|---|---|---|
| 2014/0209586 A1* | 7/2014 | Xu .......... | B23K 9/091 219/130.1 |
| 2015/0001958 A1* | 1/2015 | Abe .......... | H02J 5/005 307/104 |
| 2015/0043253 A1* | 2/2015 | Awane .......... | H02M 1/4258 363/37 |
| 2015/0365010 A1* | 12/2015 | Abe .......... | H02M 1/36 363/37 |

(Continued)

*Primary Examiner* — Mark Paschall
(74) *Attorney, Agent, or Firm* — Hauptman Ham, LLP

(57) ABSTRACT

The present invention belongs to the technical field of argon arc welding machine, and particularly refers to a welding power supply and an AC-DC argon arc welding machine. The welding power comprises a rectifying and wave-filtering unit, a first inverter unit, a transformer and a hybrid inverter unit connected one by one; the hybrid inverter unit has an unitized structural design that combines a rectifying function with a secondary inverting function through an IGBT or an IGBT half-bridge module integrated internally with FRDs; in this way, not only the types and the number of power devices are reduced, but also a difficulty of wire arrangement of an electric board is reduced, and a condition that power switches work under unbalanced state when the welding machine outputs DC is avoided, so that some problems such as a high power consumption of a traditional circuit structure, a big heat sink and a big fan, a high cost, and a complicated wire arrangement, and so on are solved, and a goal of reducing a weight and a volume of the welding machine, and the cost, and improving a welding effect is achieved.

12 Claims, 4 Drawing Sheets

(56) References Cited

U.S. PATENT DOCUMENTS

2016/0285390 A1* 9/2016 Rodriguez ................ H02J 7/34
2017/0189986 A1* 7/2017 Henry .................. B23K 9/1075
2018/0034395 A1* 2/2018 Huang ................... H02P 9/302

* cited by examiner

WELDING SOURCE AND AC-DC ARGON ARC WELDING MACHINE

TECHNICAL FIELD

The present application relates to the technical field of argon arc welding machine, and more particularly relates to a welding source and ac-dc argon arc welding machine.

BACKGROUND

Currently, a two-stage inverter circuit structure is usually used in an AC (Alternating current)-DC (Direct Current) argon arc welding machine in the market, as shown in FIG. 1, a square wave AC with low voltage and high frequency is outputted after a voltage signal of the grid is rectified and filtered, is firstly inverted, and then is decreased through a high frequency transformer; and then a DC or an AC welding current having a lower frequency is outputted, after the square wave AC is further rectified and secondary inverted.

A rectifying and secondary inverter circuit part after voltage decrease of a high frequency transformer in the prior art has two types, one type is a mode of a full-wave rectification circuit and a second full bridge inverter circuit, as shown in FIG. 2, a low voltage high frequency AC passes through a full wave rectification circuit composed of a FRD (Fast Recovery Diode) D1, a FRD D2 and is converted into a low voltage DC, the low voltage DC continues to pass through a full bridge inverter circuit composed of VT1, VT2, VT3, VT4 and is converted into a low voltage DC or a low voltage low frequency AC, and the low voltage DC or low voltage low frequency AC is outputted by electric wire and is used for welding. Another type is a mode of a bridge type rectification circuit having a centre tap and a secondary push-pull inverter circuit, as shown in FIG. 3, a low voltage high frequency AC passes through a bridge type rectification circuit composed of FRDs D1, D2, D3, D4 and is converted into a low voltage DC, and then the low voltage DC passes through a push-pull inverter circuit composed of IGBT (Isolated Gate Bipolar Transistor) Q1, IGBT Q2 and is converted into a low voltage DC or low voltage low frequency AC, the low voltage DC or low voltage low frequency AC is outputted through the electric wire and is used for welding.

There are several problems in the aforesaid two types of rectification and secondary inverter circuits in the prior art in an actual application. Taking an electric circuit structure shown in FIG. 2 as an example, in the actual application, there exists several problems as follows: a first problem is that an ordinary welding machine outputs low voltage high current, when the welding machine works, in a conducting loop, there are three conductive power devices (such as, D1+VT1+VT4, or D2+VT2+VT3, and so on), when an existing power device works, no matter the existing power device is a FRD or a IGBT or a field-effect tube, a voltage drop is always generated (generally speaking, the voltage drop is about 1-2V), the power device has an obvious power consumption especially when it lies in a large current state. In order to solve the problem of high power consumption, in a secondary inverter process, a field-effect tube having a low voltage and a low on-resistance is widely used; however, there is a defection that the cost is high and a voltage protection circuit of the field-effect tube is more strictly required; moreover, aiming at a special characteristic of an electric arc welding workpiece, using of a low voltage field-effect tube is not good for electric arc maintenance when there is a current direction change, and an arc interruption phenomenon is prone to occur, thereby affecting a welding effect. A second problem is that, when there is the current direction change, in order to improve an arc stabilization effect, an optimized arc stabilization effect can be obtained when a voltage for arc stabilization is set to be about 250V; when a field-effect tube having a withstanding voltage less than 250V is used, an arc stabilization device is more complicated and the arc stabilization effect is bad; however, when a field-effect tube having a withstanding voltage more than 250V is used, there is always a much larger on-resistance, thereby resulting in an obvious power consumption. A third problem is that a large number of power devices need to be used, and a wire arrangement of an electric board is complicated. Moreover, when the welding machine outputs a low voltage DC, a condition that two groups of power devices of the inverter circuit part are continuously conductive and two other groups of power devices of the inverter circuit part are closed will be happened; under this condition, it inevitably results that power switches are traversed continuously by high current; therefore, when the electric circuit is designed, the number of the power switches or the capability of over current must be increased, which results in an increase in the cost inevitably, and also results in problems such as an inhomogeneous heat dissipation of a heat sink and a bad heating effect, and so on.

However, there also exists some problems in the bridge type rectification circuit having a centre tap and a secondary push-pull inverter circuit as shown in the FIG. 3 in an actual application, one problem is that when the welding machine works, there are two conductive power devices (a FRD and a IGBT) in the conducting loop, compared with the full wave rectification circuit having the centre tap and the secondary full bridge inverter circuit, the number of FSDs is doubled, the number of the power switches are reduced by half, but the withstanding voltage value is doubled, and thus a whole power consumption is substantially unchanged relatively. A second problem is that since the number of the FSDs is doubled, and the bridge type rectification circuit is used, when a high current occurs, a large space is occupied, and the wire arrangement of the electric board is complicated. A third problem is that a push-pull circuit is applied in the secondary inverter circuit, since withstanding voltage value of the power switches is doubled (generally, a voltage of 600V is selected), the existing welding machine usually adopts an IGBT of high withstanding voltage and heavy current, however, a high saturation voltage drop (1-2V) of this IGBT can results in a high power consumption. A four problem is that when the welding machine is in a DC output state, a condition that one group of power switches in the inverter circuit are continuously conductive and the other group of power switches in the inverter circuit are blocked will be happened, and thus it result inevitably that the power switches are traversed by heavy current. Therefore, when the bridge type rectification circuit having the centre tap and the secondary push-pull inverter circuit is designed, the number of the power switches and the capability of over current must be increased, which results in an increase in the cost inevitably, and also results in problems including an inhomogeneous heat dissipation of the heat sink and a bad heat dissipation effect.

As stated above, there exist some problems including high power consumption, high cost and complicated wire arrangement in all power switching circuits in the existing AC-DC argon arc welding machine.

SUMMARY OF THE INVENTION

For this reason, a purpose of the present invention is to provide a welding source and an AC-DC argon arc welding machine for the purpose of solving problems including a high power consumption of a traditional circuit structure, big heat sink and fan, a high cost, and a complicated wire arrangement, and achieving a goal of reducing weight and volume of the welding machine, reducing cost, and improving welding effect.

In order to achieve the goal, on one hand: firstly, the present invention provides a welding source connected between an input end of an AC and a welding workpiece, wherein the welding source comprises:

a rectifying and wave-filtering unit configured for transforming an input AC into a high voltage DC;

a first inverter unit configured for inverting the high voltage DC outputted by the rectifying and wave-filtering unit into a high voltage high frequency AC;

a transformer configured for transforming the high voltage high frequency AC outputted by the first inverter unit into a low voltage high frequency AC; and a hybrid inverter unit configured for rectifying and performing a second inverting process for the low voltage high frequency AC outputted by the transformer, and outputting a low voltage DC or a low voltage low frequency AC to the welding workpiece;

moreover, the hybrid inverter unit has an integrated structural design that combines a rectifying function with a secondary inverting function through an IGBT or an IGBT half-bridge module integrated internally with FRDs.

Further, the welding source further comprises:

a power switch connected between the input end of the AC and the rectifying and wave-filtering unit and configured for controlling on-off of the inputted AC.

Specifically, the hybrid inverter unit comprises four IGBTs, the four IGBTs are IGBT Q1, IGBT Q2, IGBT Q3, and IGBT Q4 respectively;

wherein an emitting electrode of the IGBT Q1 and a collecting electrode of the IGBT Q3 are connected to two windings of the transformer respectively, a collecting electrode of the IGBT Q1 and a collecting electrode of the IGBT Q2 are connected together, an emitting electrode of the IGBT Q3 and an emitting electrode of the IGBT Q4 are connected together, an emitting electrode of the IGBT Q2 and a collecting electrode of the IGBT Q4 are connected together to serve as an output end of the welding source, the four IGBTs control IGBTs Q1 and Q4 or IGBTs Q2 and Q3 to be on-off alternately by PWM drive pulses; a centre tap end of the transformer serves as another output end of the welding source.

Or, the hybrid inverter unit comprises four IGBT half-bridge modules.

In another aspect, the present invention further provides an AC-DC argon arc welding machine, and the AC-DC argon arc welding machine comprises the aforesaid welding source in any form.

In the welding source and AC-DC argon arc welding machine provided by the present invention, by using an IGBT integrated internally with FRDs or an IGBT half-bridge module, a goal of combining a rectification function and a secondary inverting function as one is implemented, not only the types and the number of power devices are reduced, but also a difficulty of wire arrangement of an electric board is reduced; since a working time of each of power switches of the power circuit is always a half circle, the number of the power devices can be reduced by half in theory, even though IGBT or IGBT half bridge module of high withstanding voltage is used in the electric circuit, a power consumption generated by the electric circuit is still lower than that of a traditional circuit. Due to the use of the IGBT or the IGBT half bridge module having high withstanding voltage, a structure of an arc stabilization circuit can be much easier, a better arc stabilization effect can be obtained, and thus a better welding effect can be obtained, and power switches work under unbalanced states when the welding machine outputs DC can be avoided, and thus some problems such as a high power consumption of a traditional electric circuit structure, big heat sink and big fan, the high cost, and a complicated wire arrangement, and so on can be solved, and a goal of reducing a weight and a volume of the welding machine, and the cost, and improving a welding effect is achieved.

DETAILED DESCRIPTION OF THE PREFERRED EMBODIMENT

In order to make the purpose, technical solutions and advantages of the present invention be clearer and more understandable, the present invention will be further described in detail with reference to accompanying drawings and embodiments. It should be understood that the specific embodiments described herein are intended to explain the present invention but not limiting the present invention.

Figure 1:
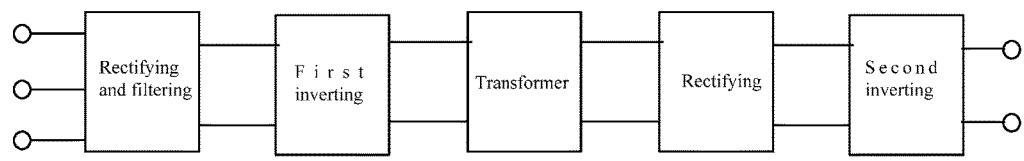
FIG. 1 illustrates a structural diagram of a power circuit of an existing AC-DC argon arc welding machine.
Figure 2:
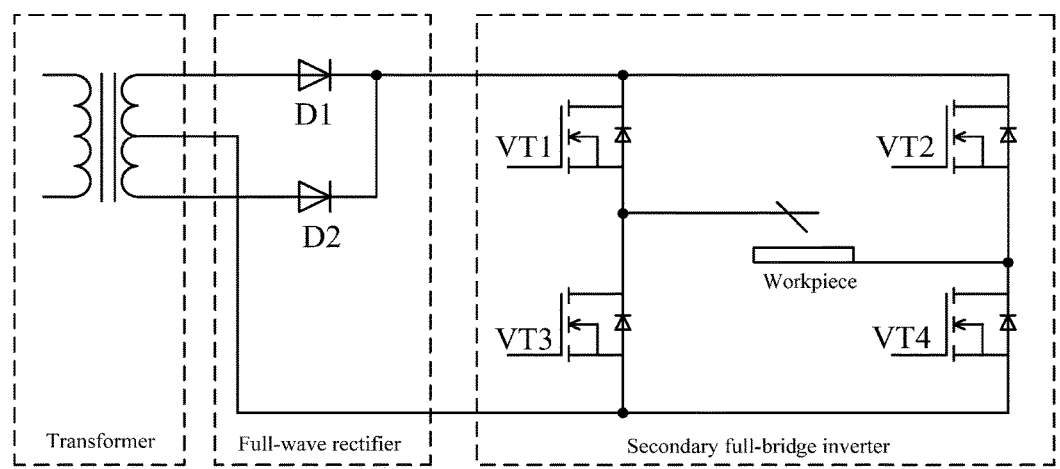
FIG. 2 illustrates one structural schematic diagram of rectifying and secondary inverter circuit part subsequent to a high frequency transformer in FIG. 1.
Figure 3:
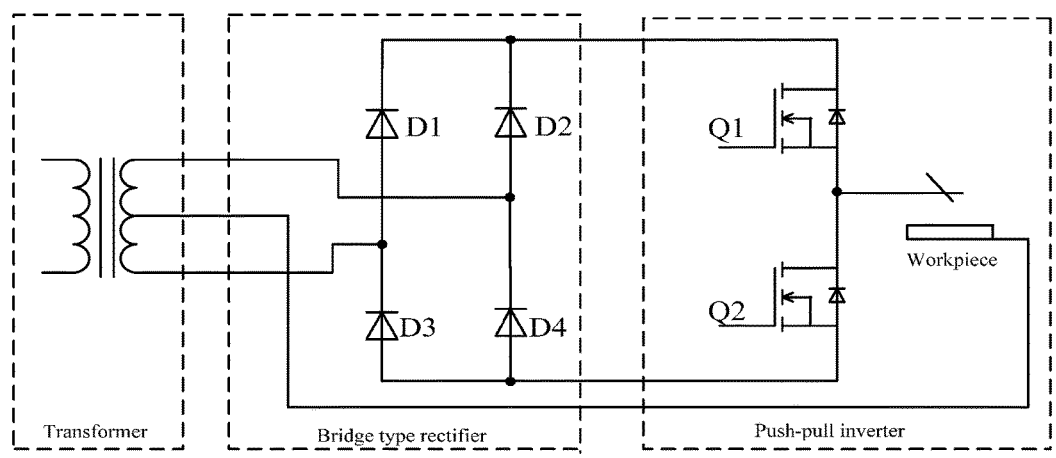
FIG. 3 illustrates another structural schematic diagram of the rectifying and secondary inverter circuit part subsequent to the high frequency transformer.
Figure 4:
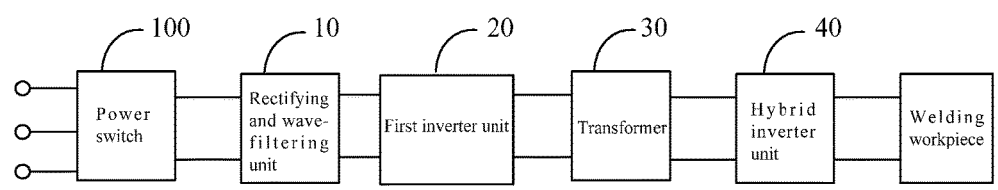
FIG. 4 illustrates a structural block diagram of a welding power provided by a preferred embodiment of the present invention.

FIG. 4 is a structural block diagram of a welding power provided by a preferred embodiment of the present invention, for convenient explanation, only the part relevant to this embodiment is illustrated, as shown in FIG. 4:

a welding power is connected between an input end of an AC (Alternating Electric current) and a welding workpiece, wherein the welding power comprises:

a rectifying and wave-filtering unit 10 is configured for transforming an inputted AC into a high voltage DC (Direct Electric current);

a first inverter unit 20 is configured for inverting the high voltage DC outputted by the rectifying and wave-filtering unit 10 into high voltage high frequency AC;

a transformer 30 is configured for transforming the high voltage high frequency AC outputted by the first inverter unit 20 into a low voltage high frequency AC; and a hybrid inverter unit 40 is configured for rectifying and performing a second inverting process for the low voltage high frequency AC outputted by the transformer 30, and outputting AC or DC to the welding workpiece;

wherein the hybrid inverter unit 40 has an integrated structural design that combines a rectifying function with a secondary inverting function through an IGBT (Isolated Gate Bipolar Transistor) or an IGBT half-bridge module which is integrated internally with FRDs (Fast Recovery Diodes).

It is preferred that the welding power can also comprise a power supply switch 100 connected between the input end of the AC and the rectifying and wave-filtering unit 10 and configured for controlling on-off of the inputted AC.

Figure 5:
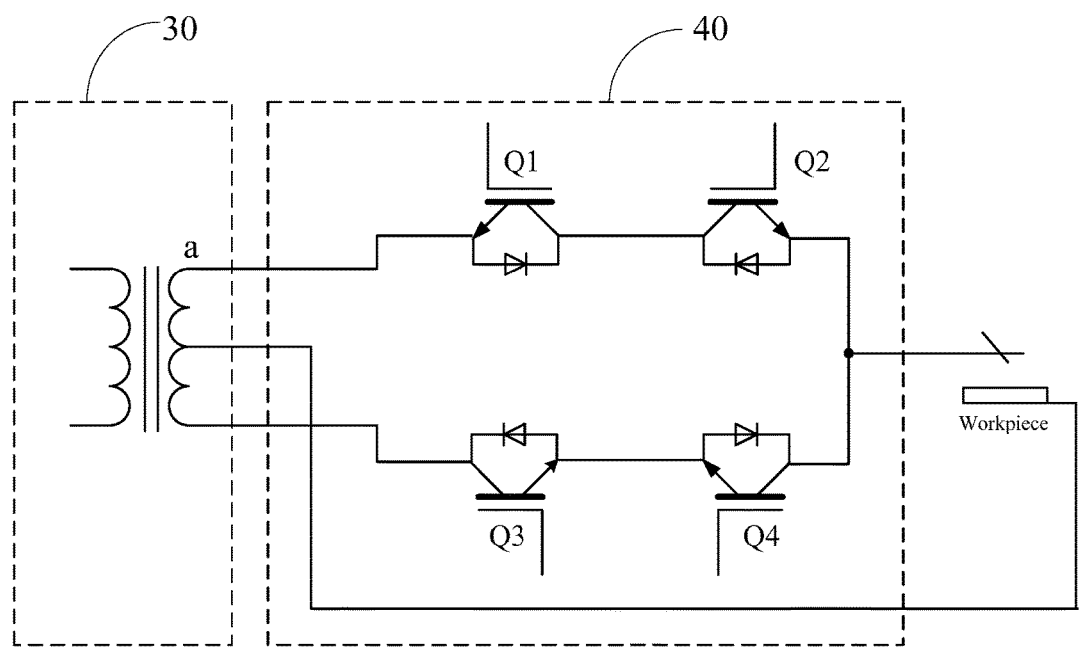
FIG. 5 illustrates a structural schematic diagram of a hybrid inverter unit in a welding power provided by one embodiment of the present invention.

FIG. 5 is a structural schematic diagram of the hybrid inverter unit 40 in the welding power provided by one embodiment of the present invention; for convenient explanation, only the part relevant to this embodiment is illustrated, as shown in the figure:

The hybrid inverter unit 40 is connected with the transformer 30 and the hybrid inverter unit 40 comprises four IGBTs, which are IGBT Q1, IGBT Q2, IGBT Q3, and IGBT Q4 respectively. Wherein an emitting electrode of the IGBT Q1 and a collecting electrode of the IGBT Q2 are connected with two windings of the transformer 30 respectively, a collecting electrode of IGBT Q1 and a collecting electrode of IGBT Q2 are connected together, an emitting electrode of IGBT Q3 and an emitting electrode of IGBT Q4 are connected together, and an emitting electrode of IGBT Q2 and a collecting electrode of IGBT Q4 are connected together and work as an output end of the welding power connected to the welding workpiece. Meanwhile, the four IGBTs respectively control IGBTs Q1, Q4 or IGBTs Q2, Q3 to be on-off alternately by two PWM (Pulse Width Modulation) drive pulses inputted from base electrodes thereof. A centre tap end of the transformer 30 is another output end of the welding power.

In an actual application, by using PWM drive pulses, IGBTs Q1, Q4, or IGBTs Q2, Q3 are controlled to be on-off alternately, thereby achieving an AC output, that is, a simplified working principle of the hybrid inverter unit is similar to full-wave rectifying circuits of two kinds of diodes. When the welding workpiece is in need of DC, it needs to set drive signals of IGBTs Q2 and Q3 or drive signals of IGBTs Q1 and Q4 to be high level; moreover, by switching drive signals of IGBTs Q2, Q3 or IGBTs Q1, Q4, the polarity of electric current outputted to the welding workpiece can also be switched.

In a specific working process of the hybrid inverter unit 40 shown in FIG. 5, if drive signals of IGBTs Q2, Q3 are high level, and drive signals of IGBTs Q1, Q4 are low level, when an output of a dotted terminal a of the high frequency transformer 30 is a high level, electric current passes through diodes in IGBT Q1, diodes in IGBT Q2 and then is outputted to a welding gun or a welding clamp, thereby forming an electric arc with the welding workpiece; then, the electric current returns back to the centre tap of the high frequency transformer 30 again through an electric wire; when the output of the dotted terminal a of the high frequency transformer 30 is low level, the electric current passes through a diode in the Q3 and a diode in Q4, then is outputted to the welding gun or the welding clamp and form the electric arc with the welding workpiece; then, the electric current returns back to the centre tap of the high frequency transformer 30 again through the electric wire; at this moment, the welding power has a DC positive output.

If drive signals of IGBTs Q1, Q4 are high level, and drive signals of IGBTs Q2, Q3 are low level, when the output of the dotted terminal a of the high frequency transformer 30 is high level, an electric current passes the centre tap of the high frequency transformer 30 and arrives at the welding workpiece and form the electric arc with the welding gun or the welding clamp, then, the electric current passes through a diode in Q4, a diode in Q3, and returns back to the high frequency transformer 30; when the output of the dotted terminal a of the high frequency transformer 30 is low level, the electric current passes through the centre tap of the transformer 30 and arrives at the welding workpiece and form the electric arc with the welding gun or the welding clamp firstly, and then passes through the diodes in Q2, the diodes in Q1, and returns back to the high frequency transformer 30; at this moment, the welding power has a DC negative output.

When a welding machine needs to output the AC, specific working principle of the welding machine is similar to that of the DC output, but driven of IGBTs is implemented by driving and controlling IGBTs Q2, Q3 or IGBTs Q1, Q4 to be on-off alternately through PWM drive pulses, such that the welding machine can output a low frequency AC, and an AC welding operation can be performed; moreover, by modulating a frequency and a duty ratio of a PWM drive pulse, a diversity of electric current wave form can be implemented, and a requirement of welding of metals, such as aluminum, magnesium, and metal alloy can be met.

Figure 6:
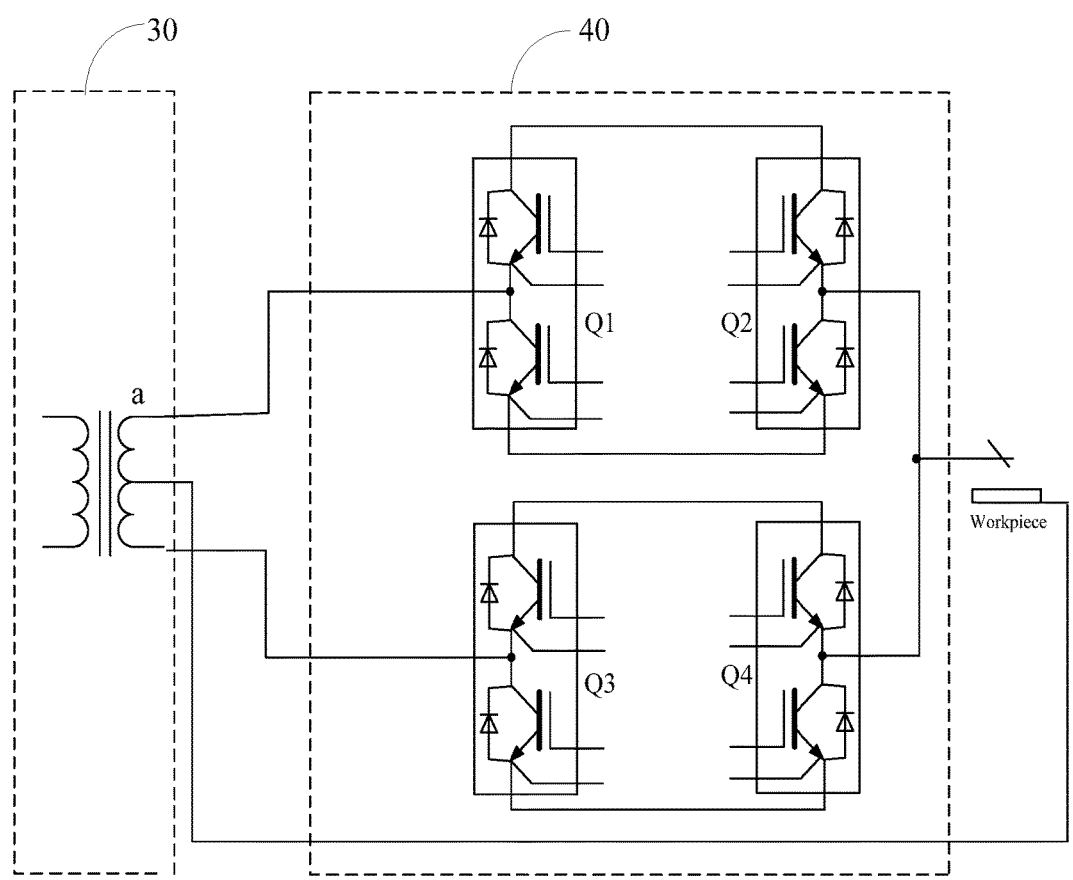
FIG. 6 illustrates a structural schematic diagram of the hybrid inverter unit in the welding power provided by another embodiment of the present invention.

FIG. 6 illustrates a structural schematic diagram of the hybrid inverter unit 40 in the welding power provided by another embodiment of the present invention; similarly, for convenient explanation, only the part relevant to this embodiment is illustrated, as shown in FIG. 6:

The hybrid inverter unit 40 is connected with the transformer 30 and comprises four IGBT half-bridge modules. The transformer 30 in the circuit is a high frequency transformer having a centre tap, and the centre tap end of the windings of the transformer 30 is one of output ends of the welding machine. IGBTs Q1, Q2, Q3, and Q4 are IGBT half-bridge modules respectively, wherein a common terminal of Q1 and a common terminal of Q3 are respectively connected with two windings of the high frequency transformer 40, and a common terminal of Q2 and a common terminal of Q4 are connected together and work as another output end of the welding machine. In a specific application, similarly, by two groups of PWM drive pulses, IGBTs half-bridge modules Q1 and Q2 or IGBTs half-bridge modules Q3 and Q4 are respectively controlled to be on-off alternately, thereby achieving an AC output. A simplified working principle of the hybrid inverter unit 40 is similar to two diode full-wave rectifying circuits, and the specific working process is not repeatedly described herein.

In another aspect, another embodiment of the present invention further provides an AC-DC argon arc welding machine, considered as an improvement, the AC-DC argon arc welding machine is provided therein with the welding power provided by any one of the aforesaid embodiments.

As stated above, the welding power and the AC-DC argon arc welding machine can be adapted to various power level inverter AC-DC argon arc welding machines, by using a plurality of single IGBTs of different numbers and connected in parallel, or IGBT half-bridge module(s), different application occasions can be met; besides, the welding power and the AC-DC argon arc welding machine are completely compatible to a drive circuit having a traditional secondary full-bridge inverter structure, and a transplantation can be conveniently implemented. In another aspect, use of FRDs for rectification is cancelled, types and numbers of power devices are reduced, the cost is reduced, the difficulty for repairing is reduced and an efficiency of assembly is improved. No matter the output of the welding machine is in a AC state or in a DC state, the power devices are always maintained at a balanced working state, and can generate heat evenly; the power devices and a heat dissipation device are efficiently utilized; with respect to a traditional structure, the number of the power devices are reduced by half theoretically. Moreover, IGBTs having high voltage resistance are used in the power switches, and thus a design of an absorption circuit can be cancelled or simplified; the IGBTs have a higher reliability, and an arc stabilizing circuit can be designed more easily, so that an arc stabilizing effect is much better, which makes a welding effect be much better.

It should be noted that, various units included in the aforesaid embodiments are only divided by functional logic, and should not be limited to aforesaid dividing way, as long as a corresponding function can be implemented; in addition, a specific name of each of the function units is only intended to distinguish from each other but not limit the protection scope of the present invention.

What stated above are merely preferable embodiments of the present invention, and should not be regarded as being limitation to the present invention. Although the present invention is described in detail according to the aforesaid embodiments, it is still possible for the one of ordinary skill in the art to amend the technical solutions or equivalently replace technical features described in each of the aforesaid embodiments. Any amendment, equivalent replacement and improvement made within the spirit and the principle of the present invention should be included in the protection scope of the present invention.

The invention claimed is:

1. A welding source connected between an input end of an AC and a welding workpiece, wherein the welding source comprises:
   a rectifying and wave-filtering unit configured for transforming an input AC into a high voltage DC;
   a first inverter unit configured for inverting the high voltage DC outputted by the rectifying and wave-filtering unit into a high voltage high frequency AC;
   a transformer configured for transforming the high voltage high frequency AC outputted by the first inverter unit into a low voltage high frequency AC; and
   a hybrid inverter unit including a plurality of IGBTs integrated internally with FRDs and configured for rectifying and performing a second inverting process for the low voltage high frequency AC outputted by the transformer, when the welding workpiece needs a low voltage low frequency AC, the IGBTs controlled to be on-off by using PWM drive pulses; when the welding workpiece needs a low voltage DC, the drive signals of some of the IGBTs set to be high level and the drive signal of the other IGBTs set to be low level.

2. The welding source according to claim 1, further including:
   a power switch connected between the input end of the AC and the rectifying and wave-filtering unit and configured for controlling on-off of the inputted AC.

3. The welding source according to claim 1, wherein the hybrid inverter unit includes four IGBTs, the four IGBTs are IGBT Q1, IGBT Q2, IGBT Q3, and IGBT Q4 respectively;
   wherein an emitting electrode of the IGBT Q1 and a collecting electrode of the IGBT Q3 are connected to two windings of the transformer respectively, a collecting electrode of the IGBT Q1 and a collecting electrode of the IGBT Q2 are connected together, an emitting electrode of the IGBT Q3 and an emitting electrode of the IGBT Q4 are connected together, an emitting electrode of the IGBT Q2 and a collecting electrode of the IGBT Q4 are connected together to serve as an output end of the welding source.

4. The welding source according to claim 1, wherein the IGBTs integrated internally with FRDs are replaced by IGBTs half-bridge modules integrated internally with FRDs.

5. The welding source according to claim 3, wherein through PWM drive pulses, the IGBT Q1, the IGBT Q4 are controlled to be on when the IGBT Q2, the IGBT Q3 are controlled to be off; and the IGBT Q1, the IGBT Q4 are controlled to be off when the IGBT Q2, the IGBT Q3 are controlled to be on.

6. The welding source according to claim 3, wherein the drive signals of the IGBT Q1 and the IGBT Q4 are set to be high level when the drive signals of the IGBT Q2 and the IGBT Q3 are set to be low level; and the drive signals of the IGBT Q1 and the IGBT Q4 are set to be low level when the drive signals of the IGBT Q2 and the IGBT Q3 are set to be high level.

7. An AC-DC argon arc welding machine comprising a welding source connected between an input end of AC and a welding workpiece, wherein the welding source comprises:
   a rectifying and wave-filtering unit configured for transforming input AC into a high voltage DC;
   a first inverter unit configured for inverting the high voltage DC outputted by the rectifying and wave-filtering unit into a high voltage high frequency AC;
   a transformer configured for transforming the high voltage high frequency AC outputted by the first inverter unit into a low voltage high frequency AC; and
   a hybrid inverter unit including a plurality of IGBTs integrated internally with FRDs and configured for rectifying and performing a second inverting process for the low voltage high frequency AC outputted by the transformer, when the welding workpiece needs a low voltage low frequency AC, the IGBTs controlled to be on-off by using PWM drive pulses; when the welding workpiece needs a low voltage DC, the drive signals of some of the IGBTs set to be high level and the drive signal of the other IGBTs set to be low level.

8. The AC-DC argon arc welding machine according to claim 7, wherein the welding source further includes:
   a power switch connected between the input end of the AC and the rectifying and wave-filtering unit and configured for controlling on-off of the input AC.

9. The AC-DC argon arc welding machine according to claim 7, wherein the hybrid inverter unit includes four IGBTs, the four IGBTs are IGBT Q1, IGBT Q2, IGBT Q3, and IGBT Q4 respectively;
   wherein an emitting electrode of the IGBT Q1 and a collecting electrode of the IGBT Q3 are connected to two windings of the transformer respectively, a collecting electrode of the IGBT Q1 and a collecting electrode of the IGBT Q2 are connected together, an emitting electrode of the IGBT Q3 and an emitting electrode of the IGBT Q4 are connected together, an emitting electrode of the IGBT Q2 and a collecting electrode of the IGBT Q4 are connected together to serve as an output end of the welding source.

10. The AC-DC argon arc welding machine according to claim 7, wherein the IGBTs integrated internally with FRDs are replaced by IGBTs half-bridge modules integrated internally with FRDs.

11. The AC-DC argon arc welding machine according to claim 9, wherein through PWM drive pulses, the IGBT Q1, the IGBT Q4 are controlled to be on when the IGBT Q2, the IGBT Q3 are controlled to be off; and the IGBT Q1, the IGBT Q4 are controlled to be off when the IGBT Q2, the IGBT Q3 are controlled to be on.

12. The AC-DC argon arc welding machine according to claim 9, wherein the drive signals of the IGBT Q1 and the IGBT Q4 are set to be high level when the drive signals of the IGBT Q2 and the IGBT Q3 are set to be low level; and the drive signals of the IGBT Q1 and the IGBT Q4 are set to be low level when the drive signals of the IGBT Q2 and the IGBT Q3 are set to be high level.

* * * * *